United States Patent

Lininger

[15] 3,687,567

[45] Aug. 29, 1972

[54] WAVE POWERED GENERATOR

[72] Inventor: William W. Lininger, 775 S. Corona, Denver, Colo. 80209

[22] Filed: Nov. 4, 1970

[21] Appl. No.: 86,666

[52] U.S. Cl. ..........................415/7, 415/52, 415/66, 415/151
[51] Int. Cl. ..............................................F01d 25/28
[58] Field of Search.................415/7, 51, 52, 66, 151

[56] References Cited

UNITED STATES PATENTS

| | | | |
|---|---|---|---|
| 1,003,635 | 9/1911 | Melander | 415/151 |
| 1,015,627 | 1/1912 | Master | 415/60 |
| 1,017,860 | 2/1912 | Dungan | 415/7 |
| 1,350,265 | 8/1920 | Recuero | 415/60 |
| 1,476,457 | 12/1923 | Miller | 415/66 |
| 1,782,277 | 11/1930 | Smith | 415/7 |

*Primary Examiner*—C. J. Husar
*Attorney*—Richard D. Law

[57] ABSTRACT

A power generator, utilizing ocean waves as a motivating force, having at least one undershot paddle wheel above a upward sloping gathering platform and at least one paddle wheel arranged below the platform at one end. The upper paddle wheels, arranged to deliver power from incoming waves, and, outgoing waves are arranged to rotate a propeller shaft. The gathering platform guides incoming waves in an undershot action on the wheels and discharges some of the water over the end of the platform in an overshot action on the paddle wheel below the platform.

2 Claims, 10 Drawing Figures

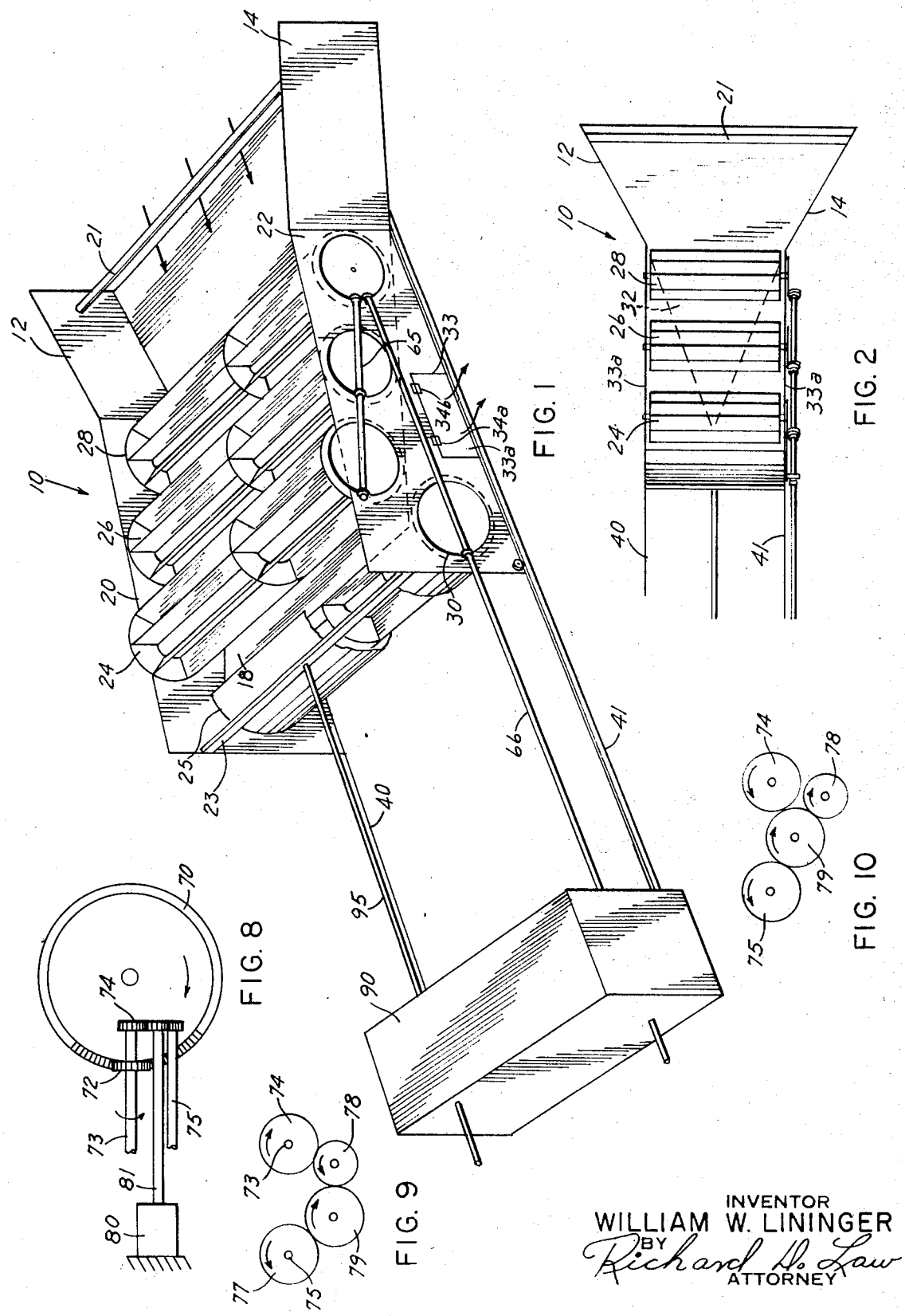

INVENTOR
WILLIAM W. LININGER

WAVE POWERED GENERATOR

While it has long been recognized that the forces of nature such as wind, sunlight, and wave power are potental sources of tremendous energy, such energy has rarely been put to practical use. Utilization of such energy sources has been limited because primary energy output therefrom varies significantly with time. In most mechanical systems for generating electric power it has been imperative to have a constant power source, since satisfactory methods of storing electrical power have not been previously available. Previously, the only force of nature to be widely used has been the force of falling water, which from a dam will deliver essentially constant power. As the supply of fossil fuels declines and as the tremendous dangers of environmental pollution by fossil fuels are recognized, the demand for inexpensive, non-polluting power sources increases. The number of useful dam sites for power purposes has significantly decreased as the easily usable sites have been taken. Today, electrical batteries and other devices are being developed to efficiently store large quantities of electrical power. Having such batteries, it is no longer imperative that the primary energy sources deliver constant power over a continuous period of time, and the emphasis may turn to non-uniform, clean, non-polluting energy sources.

One such source is water wave power. Ocean waves exhibit essentially two types of motion. The first is a water level or rise-and-fall, undulating motion. Many early devices attempted to employ this rise-and-fall type motion, but such devices have proved rather unsuccessful because they must be stationary and breaking waves severely batter the devices. The second component of ocean wave motion is the to-and-fro motion generally associated with waves closer to shore and with the tidal cycles. Early attempts to use that component of wave motion were hindered because of the great differences of wave height. Also adjustments needed continually to be made for varying tidal level.

According to the present invention there is provided a wave power generator which utilizes a gathering platform for accumulating and directing incoming wave propelled water under a series of paddle wheels. Receeding water drives a partially protected paddle wheel under the platform. The rotation of the paddle wheels above the platform reverses under influence of the outgoing water with means to utilize the reverse rotation to generate more power, and the paddle wheel below the platform is shielded from incoming water. Additionally, the paddle wheel below the platform is shielded so that outgoing water spilling over the platform strikes and drives the wheel in an overshot action, and is discharged out the sides of the unit. A common frame supports all of the paddle wheels and the gathering platform. The frame is preferably rail mounted to be positioned in response to water level, as tides ebb and flow. Means for changing the position of the mechanism may be made automatic to follow precisely the ebb and flow of the tides.

Included among the objects and advantages of the invention is to provide a wave powered generator for producing inexpensive power.

Another object of the invention is to provide a wave powered generator utilizing a gathering platform for producing an undershot water flow on paddle wheels by both incoming and outgoing waves.

A still further object of the invention is to provide a wave powered generator utilizing rotating paddle wheels, where the generator is arranged to reciprocate towards and away from shore according to the level of the water.

A still further object of the invention is to provide a wave powered generator with a gathering platform which directs incoming waves in an undershot action under paddle wheels and which directs such gathered water onto another paddle wheel so as to cause that wheel to work as an overshot wheel for outflowing water.

An additional object of the invention is to provide an inexpensive, durable, wave powered generator which may be positioned in the water adjacent to a shore line for utilizing the power of sea waves ebbing and flowing from the shore.

These and other objects and advantages of the invention may be readily ascertained by referring to the following description and appended illustrations in which:

FIG. 1 is a pictoral view of a device according to the invention;

FIG. 2 is a reduced-scale plan view of the device of FIG. 1;

FIG. 8 is a schematic diagram of one form of a gearing arrangement for providing unirotation of a power shaft from a gearing connection between a drive shaft from the upper paddle wheels and the power shaft;

FIG. 9 is a schematic diagram of the gearing of FIG. 8 in one direction rotation; and FIG. 10 is a schematic diagram of the gearing of FIG. 8 in the opposite direction of rotation of the drive shaft.

Figures 3, 4:
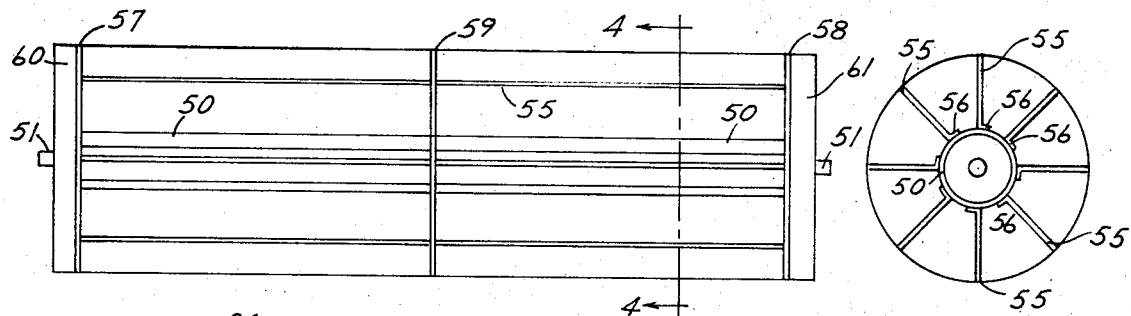
FIG. 3 is a front elevational view of one form of paddle wheel useful for a wave powered generator according to the invention.
FIG. 4 is a cross-sectional view of the paddle wheel of FIG. 3 taken along section line 4—4.

In the device illustrated in FIGS. 1, 2, 6 and 7, an incoming wave catch or gathering ramp, show in general by numeral 10, includes gathering wings 12 and 14 converging to an upwardly sloping ramp 18, having upright sides 20 and 22. The wings and sides are spaced-apart and supported by cross-members such as members 21 and 23. The wings and the ramp may be made of any material sufficiently strong to support the weight of water and the pounding of waves flowing up the ramp. Boards, sheet metal, and the like, mounted on supporting beams may be used. The wings 12 and 14 gather the wave propelled water at the mouth of the platform and converge the water onto the ramp 18. The funneling effect of the wings produce an increased quantity and increased velocity of water moving up the ramp for each incoming wave in relation to the ramp width. Water flows up the ramp under paddle wheels 24, 26 and 28 supported above the ramp. While three are shown, one or more paddle wheels may be utilized to capture the power of the incoming flow of water. The three wheels, as shown, effectively utilize the incoming wave power in one particular application. The upper end of ramp 18 has an arcuately curved downward portion 25 that recurves under the ramp. Beneath platform 18, and partially shielded by the arcuate portion 25, is paddle wheel 30. Extending below the wheel 30 and joined to the arcuate portion 25 is a generally planar floor 32. Opposed side doors 33a (opening outwardly only) mounted on hinges 34a and 34b, exhaust water from the lower paddle wheel and prevents incoming waves from entering the lower chamber.

The ramp sides, planar floor, and paddle wheels are suitably supported on a frame structure and must, also, be sufficiently strong to support the weight of contained water and the pounding from the waves. The supporting structure may be made of wood, steel or conventional materials necessary to withstand the corrosion from the sea water and with sufficient strength to support the mechanisms.

Preferably, the unit is mounted on tracks such as 40 and 41. A sufficient number of roller wheels such as 42 and 43 of FIG. 6 and supporting structure are provided on the unit so that it may be reciprocated up and down a beach toward and away from the water. The number of roller wheels necessary for free reciprocal motion of the unit depends upon the size and the weight of the unit; providing such wheels is conventional for the movement of large equipment such as the present device.

Preferably, the paddle wheels are light but sufficiently strong to retain their structural integrity under the action of the waves. In one form, the wheels are formed of elongated paddles mounted on a central tube. As illustrated in FIGS. 3 and 4, a central tube 50 is suitably provided with a shaft 51 for mounting in bearings in the wall of the unit. Such mounting and bearing arrangements are conventional. Secured to the exterior of the tube 50 in longitudinal array, are a plurality of paddles 55, which are provided with an angled end 56 welded, rivoted, bolted, or otherwise secured to the exterior of the tube 50 supporting these paddles radially outwardly from the tube. In some instances, hinged blades may, also, be used on the wheels when free wheeling for reverse flow of water down the ramp is desired. Annular end braces 57 and 58 may be provided for the unit and an annular center brace 59 provided additional strength for the paddle wheel. Weighted elements 60 and 61 may be provided on the paddle to act as flywheels for smooth, uniform rotation of the paddle wheel. In one size, a 6—-inch diameter tube supporting 45—-inch blades provides a satisfactory paddle wheel. Other sizes may, obviously, be utilized.

Figure 6:
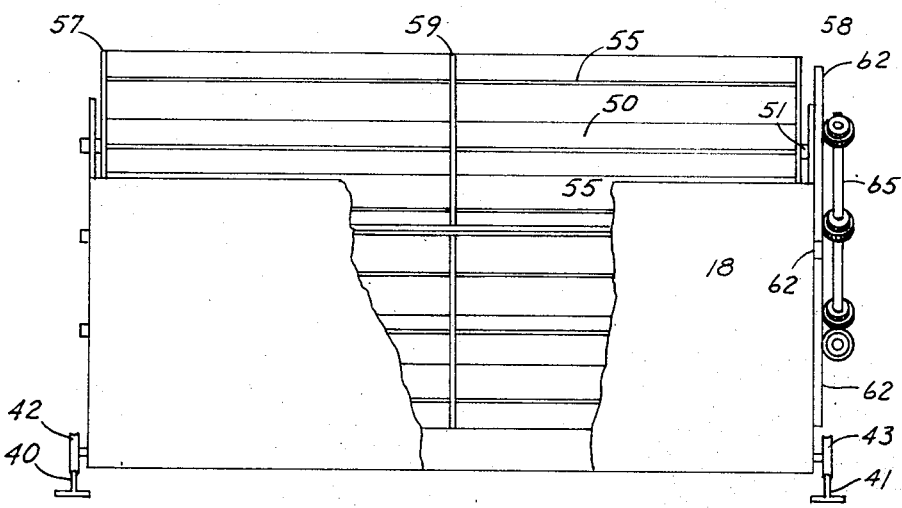
FIG. 6 is an end view of the wave powered generator according to the invention.
Figure 7:
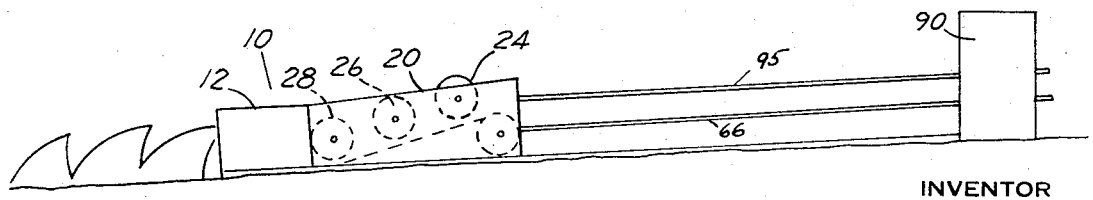
FIG. 7 is a side elevational view, in reduced scale, of the generator according to the invention illustrating positioning of the generator on a seashore.

In one form, the rails 40 and 41 are illustrated as inverted T-shaped rails, FIG. 6, however, these may be any conventional type of rail which will support the weight of such a unit, so long as these are arranged to mate with and reciprocally support the wheels of the unit.

Figure 5:
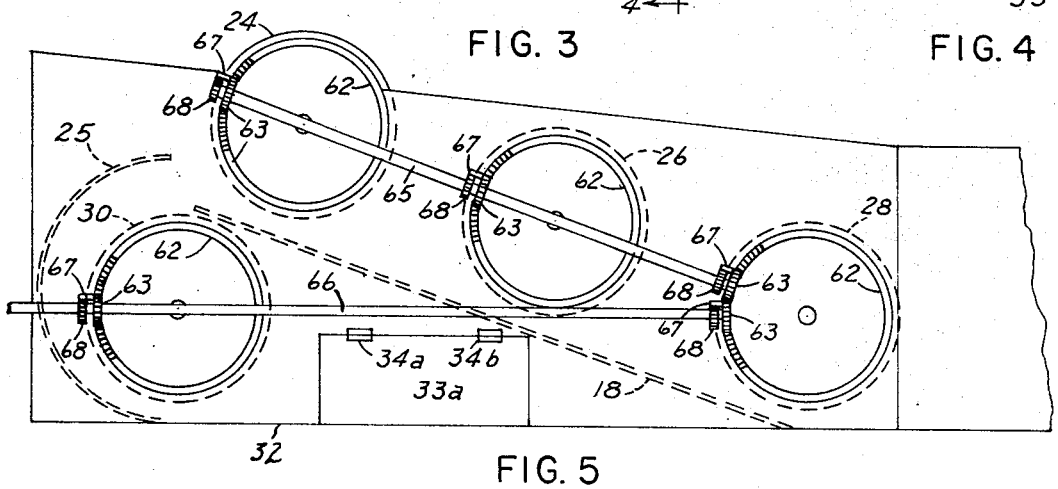
FIG. 5 is a schematic view of one embodiment of the power transmission means according to the invention.

Power may be taken from the upper paddle wheels by any conventional power takeoff means, and one form is illustrated in FIG. 5, wherein a beveled ring gear 62 on the end of each paddle wheel's shaft is meshed with a driven bevel gears 63 on propeller shafts 65 and 66. When free wheeling is desired for reverse flow, gears 63 freely rotate on the propeller shafts for one direction of rotation. In rotation in the reverse direction, ratchets 67 which are fixed to the rear of gears 63 engage gears 68 fixed to the shafts and, thereby, drive the shafts. Such one-way gearing arrangements are conventional. A gearing arrangement for permitting two-way rotation of the paddle wheels with a single way rotation of the power shaft, is shown schematically in FIGS. 8–10. A bevel gear 70 rotated by a paddle wheel drives a shaft mounted small bevel gear 72 mounted on shaft 73. Shaft 73 may, also, connect additional paddle wheels, as shown in FIG. 1 for shaft 65. A gear 74, mounted on shaft 73 rotates a gear train to power shaft 75 in a counterclockwise rotation. In FIG. 9, the gear 74 rotates clockwise, turning engaged gear 78 counterclockwise which turns gear 79 clockwise. Gear 79 is permanently engaged with gear 77 turning it counterclockwise. When gear 74 is reversed gear 78 is disengaged from it and gear 79 moves to engage gear 74. Thus gears 79 and 77 rotate their same direction regardless of the rotation of gear 74. The gears 78 and 79 are shifted by means of a pivoted wing 80 mounted on the side wall of ramp so to pivot toward the ramp when water is flowing up the ramp and to swing out when water is flowing down the ramp. A lever 81 is linked to the shafts of gears 78 and 79 to cause them to singly and individually engage gear 74.

With water flowing up the ramp the wing 80 pivots toward the wall moving gear 79 out of engagement with gear 74 and gear 78 into engagement with gear 74. Gears 78 and 79 remain in engagement. As water flows back down the ramp, the wing 80 swings outwardly disengaging gear 78 and engaging gear 79 with gear 74. This maintains the power shaft 66 rotating in the same direction. The paddle wheel 30, also, rotates the power shaft 66 in the same direction.

Obviously, other types of power takeoffs and drives, which may include chain drives or the like, may be utilized in connection with the paddle wheels. Also, it may be desirable to utilize two power takeoffs for each of the paddle wheels, one from each end. In one embodiment, the paddle wheel free-wheel in a direction opposite the power run. There are a number of conventional arrangements by which such free wheeling action may be effected. The paddles may be one-way hinged, the paddle wheels may be ratcheted, or one-way clutches such as cam clutches, roller and gravity-pawl clutches, etc. may be used on the paddle wheel axles.

The propeller shaft 66 extends into a power house 90, where the propeller shaft is utilized to drive an electric generator (not shown). The power or motion transfer mechanism between the propeller shaft 66 and the generator may be any conventional transfer mechanism such as a gear drive, including a bevel gear. Furthermore, since the ocean contacting unit reciprocates toward and away from the power house 90, a slip motion must be provided between the propeller shaft 66 and the power transfer mechanism. This may simply be a square shaft in a square hub of a drive gear which permits the propeller shaft to slide through the square opening of the hub as the ocean contacting unit is moved toward and away from the shore. Obviously, a telescoping propeller shaft may be used, as well as other types of power transfer means.

To move the unit up and sown the beach, a push-pull rod 95 is attached to the overhead brace 23 and passes into the power house 90. In one form, the push-pull rod 95 may be a jack screw with the rotating means being essentially conventional and mounted in the house for moving the unit toward and away from the power house 90. The push-pull rod may, also, be a rack with a pinion drive. The pinion drive is mounted in the house, and the rack is extendable through the power house, such push-pull motion being formed of conventional mechanical elements. A rope and pulley arrangement may be used where the shore is steep enough to permit the weight of the unit to move it out away from the power house. Also, a hydraulic, telescoping cylinder may be used to move the unit up and down the beach. The movement of the unit may be timed according to the tides, and the mechanism for adjusting the position of the unit may be a timing device set with the tides. The control may be an independent float controlled water level finder which actuates the motor moving the unit toward and away from the power house in response to water level. The timing mechanism may be a conventional timing mechanism, set to move the unit in relation to the ebb and flow of the tides so as to position the unit at the correct level in the ocean for producing the necessary power for rotating the paddle wheels.

The unit may be made as wide as desired, depending upon the shore conditions and the power requirements. The diameters of the paddle wheels are determinded by the size of the unit and the gathering capacity of the wave receiving platform and its ability to force a sufficient amount of water under the paddle wheels for rotation.

In general, the unit is placed in the ocean at about normal water level (disregarding the waves). As a wave comes into the shore, a portion of the water is gathered in by wings 12 and 14, which causes the water to converge onto the ramp 18, where the wave propelled water flows in an undershot flow under the upper paddle wheels. Incoming water flowing on ramp 18 spills over the end to contact lower paddle wheel 30. Water is prevented from contacting the lower chamber by the sides and the on-way doors. After the wave has reached its maximum shoreward movement and begins to receed, the paddle wheels will be driven in the opposite direction. Then the upper wheels will be reversed providing additional power along with the lower wheel 30, Wheel 30 is driven by the overshot flow. As shown in FIG. 2, the floor below the lower paddle wheel 30 is tapered towards the front. Such a tapered floor provides unrestricted exhaust through outlets 33 at each side for the receeding water after driving paddle wheel 30.

Incoming waves do not always approach the shore in a parallel array, and thus the rails should be anchored to prevent side movement if the waves impinge on the unit at an angle. Further, it may be desirable to use a locking frame for the wheels on the frame to prevent the unit from being removed from the rails by wave action. The wings, furthermore, gather the waves whether approaching head-on to the ramp or from an angle.

I claim:

1. A wave powered generator, comprising
   a. a wheeled frame including a ramp having a wide mouth converging to a narrow neck, and an upwardly sloped ramp extending from along said neck to an elevated point and having at said elevated point an arcuate portion extending downwardly for directing water flowing to the top of the ramp downwardly;
   b. at least one paddle wheel rotatably mounted above said sloped ramp in position to contact water flowing up said sloped ramp with paddles in their lowest position in an undershot flow and freewheel in a reverse flow of water.
   c. a lower paddle wheel rotatably mounted below and partly shielded by the elevated end of said sloped ramp in position to receive water spilling over the elevated end of said ramp in an overshot flow,
   d. a planar floor member supported on said below said lower paddle means; side members including one-way outwardly swinging exhaust doors for shielding said lower paddle wheel from incoming waves around said sloped ramp,
   e. power take off means interconnected to said at least one paddle wheel and said lower paddle wheel for unidirectionally transmitting the rotary motion of said paddle wheels rotated by an incoming wave,
   f. and rail means extending into the ocean for movement of said frame.

2. A wave powered generator according to claim 1 wherein said arcuate portion recurves around said lower paddle wheel providing a long arc contact of water on the blades thereof.

* * * * *